US012627572B2

(12) United States Patent
Veggalam et al.

(10) Patent No.: US 12,627,572 B2
(45) **Date of Patent: *May 12, 2026**

(54) RECOMMENDATION ENGINE WITH MACHINE LEARNING FOR GUIDED SERVICE MANAGEMENT, SUCH AS FOR USE WITH EVENTS RELATED TO TELECOMMUNICATIONS SUBSCRIBERS

(71) Applicant: T-Mobile USA, Inc., Bellevue, WA (US)

(72) Inventors: Vijay Veggalam, Parsippany, NJ (US); Prabha Jayaram, Cranbury, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/450,698

(22) Filed: Aug. 16, 2023

(65) Prior Publication Data

US 2023/0396513 A1     Dec. 7, 2023

Related U.S. Application Data

(63) Continuation of application No. 17/515,053, filed on Oct. 29, 2021, now Pat. No. 11,770,307.

(51) Int. Cl.
| | |
|---|---|
| *H04L 41/16* | (2022.01) |
| *G06F 18/214* | (2023.01) |
| *H04L 41/0816* | (2022.01) |

(52) U.S. Cl.
CPC .......... *H04L 41/16* (2013.01); *G06F 18/2148* (2023.01); *H04L 41/0816* (2013.01)

(58) Field of Classification Search
CPC .. H04L 41/16; H04L 41/0816; G06F 18/2148
(Continued)

(56) References Cited

U.S. PATENT DOCUMENTS

| | | |
|---|---|---|
| 7,233,933 B2 | 6/2007 | Horvitz et al. |
| 7,593,904 B1 | 9/2009 | Kirshenbaum et al. |
(Continued)

FOREIGN PATENT DOCUMENTS

| | | |
|---|---|---|
| CN | 109343995 A | 2/2019 |
| DE | 102015225144 A1 | 6/2017 |
(Continued)

OTHER PUBLICATIONS

Wu, Y., Dobriban, E. Davidson, S.. (2020). DeltaGrad: Rapid retraining of machine learning models. < i>Proceedings of the 37th International Conference on Machine Learning in Proceedings of Machine Learning Research Available from https://proceedings.mlr. press/v119/wu20b.html (Year: 2020).*
(Continued)

*Primary Examiner* — Taylor A Elfervig
(74) *Attorney, Agent, or Firm* — Perkins Coie LLP

(57) ABSTRACT

A system can obtain a service request message indicating an event that affects a user device of a telecommunications network. The system can store an indication of the event at a memory device that stores historical information of events and can process the event with a machine learning (ML) model that is trained based on the historical information to simulate the effect of the event on the telecommunications network. The system generates an output for display on a computing device. The output includes a recommendation and identifies an attribute of the event and a predicted value configured to reduce a workload or increase operational efficiency. The recommendation is configured to make the event actionable. The system receives feedback that a reviewer has acted on the recommendation. In response to the feedback, the system can re-train the ML model and configure the process for handling the service request.

20 Claims, 6 Drawing Sheets

(58) Field of Classification Search
USPC .......................................................... 709/223
See application file for complete search history.

(56) References Cited

U.S. PATENT DOCUMENTS

| | | | |
|---|---|---|---|
| 7,809,663 B1 | 10/2010 | Birch et al. | |
| 7,930,681 B2 | 4/2011 | Kloeffer et al. | |
| 9,297,723 B1 | 3/2016 | Hofmann et al. | |
| 9,306,962 B1 | 4/2016 | Pinto | |
| 9,548,987 B1 | 1/2017 | Poole | |
| 9,582,781 B1 | 2/2017 | Kearns et al. | |
| 9,659,251 B2 | 5/2017 | Tang et al. | |
| 9,928,342 B1 | 3/2018 | Laborde | |
| 9,972,014 B2 | 5/2018 | Mccord et al. | |
| 10,003,508 B1 | 6/2018 | Cogan et al. | |
| 10,043,591 B1 | 8/2018 | Laborde | |
| 10,044,563 B2 | 8/2018 | Guven et al. | |
| 10,210,470 B2 | 2/2019 | Datta Ray | |
| 10,247,566 B2 | 4/2019 | Schelhaas | |
| 10,270,644 B1 | 4/2019 | Valsecchi et al. | |
| 10,304,014 B2 | 5/2019 | Garza et al. | |
| 10,476,742 B1 | 11/2019 | Szarvas | |
| 10,642,719 B1 | 5/2020 | Balasubramanian et al. | |
| 10,706,453 B1 | 7/2020 | Morin et al. | |
| 10,708,151 B2 | 7/2020 | Dixon et al. | |
| 10,770,181 B2 | 9/2020 | Bull et al. | |
| 10,789,367 B2 | 9/2020 | Joseph Durairaj et al. | |
| 10,803,169 B1 | 10/2020 | Flatten et al. | |
| 10,805,184 B2 | 10/2020 | Carroll et al. | |
| 10,866,848 B2 | 12/2020 | Bridges et al. | |
| 10,872,002 B2 | 12/2020 | Jannu et al. | |
| 10,891,571 B2 | 1/2021 | Relangi | |
| 10,937,089 B2 | 3/2021 | Nandan et al. | |
| 10,977,711 B1 | 4/2021 | Verma et al. | |
| 11,017,474 B1 | 5/2021 | Guerrero et al. | |
| 11,055,652 B1 | 7/2021 | Kannan et al. | |
| 11,082,529 B2 | 8/2021 | Meng et al. | |
| 11,086,643 B1 | 8/2021 | Sharma et al. | |
| 11,115,432 B2 | 9/2021 | Singh | |
| 11,343,146 B1 | 5/2022 | Mohanty et al. | |
| 11,715,051 B1* | 8/2023 | Baskaran | G06N 5/04 |
| | | | 707/758 |
| 12,322,491 B2* | 6/2025 | Neumann | G16H 20/60 |
| 12,333,467 B2* | 6/2025 | Chinnamgari | G06Q 50/40 |
| 2003/0208754 A1 | 11/2003 | Sridhar et al. | |
| 2004/0153445 A1 | 8/2004 | Horvitz et al. | |
| 2007/0180522 A1 | 8/2007 | Bagnall | |
| 2009/0099862 A1 | 4/2009 | Fireman et al. | |
| 2011/0093418 A1 | 4/2011 | Kwok | |
| 2013/0253942 A1 | 9/2013 | Liu et al. | |
| 2015/0286650 A1 | 10/2015 | Stump | |
| 2016/0292734 A1 | 10/2016 | Jia | |
| 2017/0178007 A1 | 6/2017 | Yu et al. | |
| 2017/0255888 A1 | 9/2017 | Mccord et al. | |
| 2018/0131810 A1 | 5/2018 | Yokel | |
| 2018/0191867 A1 | 7/2018 | Siebel et al. | |
| 2018/0248904 A1 | 8/2018 | Villella et al. | |
| 2018/0276912 A1* | 9/2018 | Zhou | G05B 23/0275 |
| 2018/0285777 A1 | 10/2018 | Li et al. | |
| 2019/0028557 A1 | 1/2019 | Modi et al. | |
| 2019/0050948 A1 | 2/2019 | Perry et al. | |
| 2019/0057774 A1 | 2/2019 | Velez et al. | |
| 2019/0065975 A1 | 2/2019 | White | |
| 2019/0122160 A1 | 4/2019 | Kolandaiswamy et al. | |
| 2019/0251694 A1* | 8/2019 | Han | G06T 7/11 |
| 2019/0268214 A1 | 8/2019 | Maes et al. | |
| 2019/0371463 A1 | 12/2019 | Asthana et al. | |
| 2020/0004957 A1 | 1/2020 | Chamaraju et al. | |
| 2020/0027052 A1 | 1/2020 | Aiyer | |
| 2020/0034270 A1* | 1/2020 | Desai | H04L 41/40 |
| 2020/0103894 A1 | 4/2020 | Cella et al. | |
| 2020/0211061 A1 | 7/2020 | Dasgupta et al. | |
| 2020/0289033 A1 | 9/2020 | Sivertsen et al. | |
| 2020/0293946 A1 | 9/2020 | Sachan et al. | |
| 2020/0320383 A1 | 10/2020 | Dechu et al. | |
| 2020/0334641 A1 | 10/2020 | Singh et al. | |
| 2020/0334979 A1 | 10/2020 | Gonçalves et al. | |
| 2020/0344253 A1 | 10/2020 | Kurup et al. | |
| 2020/0372415 A1* | 11/2020 | Mann | H04L 41/5074 |
| 2020/0394576 A1 | 12/2020 | Fan et al. | |
| 2020/0394697 A1 | 12/2020 | Paolella et al. | |
| 2020/0401932 A1 | 12/2020 | Kumar et al. | |
| 2020/0402019 A1 | 12/2020 | Truong et al. | |
| 2021/0007023 A1 | 1/2021 | Umapathy et al. | |
| 2021/0021494 A1 | 1/2021 | Yao et al. | |
| 2021/0037032 A1 | 2/2021 | Soeder et al. | |
| 2021/0042662 A1 | 2/2021 | Pu et al. | |
| 2021/0049524 A1 | 2/2021 | Nachum et al. | |
| 2021/0064346 A1 | 3/2021 | Exertier et al. | |
| 2021/0064624 A1 | 3/2021 | Carbune et al. | |
| 2021/0064953 A1 | 3/2021 | Exertier et al. | |
| 2021/0073291 A1* | 3/2021 | Hunter | G06F 16/1858 |
| 2021/0103719 A1 | 4/2021 | Tsai et al. | |
| 2021/0117860 A1 | 4/2021 | Ergen | |
| 2021/0132947 A1 | 5/2021 | John et al. | |
| 2021/0133670 A1 | 5/2021 | Cella et al. | |
| 2021/0158423 A1 | 5/2021 | Ngo et al. | |
| 2021/0176261 A1 | 6/2021 | Yavo et al. | |
| 2021/0192632 A1 | 6/2021 | Amaral et al. | |
| 2021/0200197 A1 | 7/2021 | Breyfogle et al. | |
| 2021/0202099 A1 | 7/2021 | Bostic et al. | |
| 2021/0216831 A1* | 7/2021 | Ben-Itzhak | G06F 18/2155 |
| 2021/0264332 A1 | 8/2021 | Pingali et al. | |
| 2021/0273973 A1 | 9/2021 | Boyer et al. | |
| 2021/0279644 A1* | 9/2021 | Givental | G06F 18/2321 |
| 2022/0172100 A1* | 6/2022 | Balasubramanian | |
| | | | G06T 7/0008 |

FOREIGN PATENT DOCUMENTS

| | | | |
|---|---|---|---|
| EP | 1194862 A1 | 4/2002 | |
| EP | 3340133 A1 | 6/2018 | |
| EP | 3516583 A1 | 7/2019 | |
| EP | 3557502 A1 | 10/2019 | |
| KR | 102173553 B1 | 11/2020 | |
| KR | 20200139966 A | 12/2020 | |
| WO | 2019113122 A1 | 6/2019 | |
| WO | 2019121676 A1 | 6/2019 | |
| WO | 2020178829 A1 | 9/2020 | |
| WO | 2020264319 A1 | 12/2020 | |
| WO | 2021028442 A1 | 2/2021 | |
| WO | 2021149075 A1 | 7/2021 | |

OTHER PUBLICATIONS

C. Stanik, M. Haering and W. Maalej, "Classifying Multilingual User Feedback using Traditional Machine Learning and Deep Learning," 2019 IEEE 27th International Requirements Engineering Conference Workshops (REW), Jeju, Korea (South), 2019, pp. 220-226, (Year: 2019).*

S. Asthana, S. Kwatra and S. Pandit, "ML Model Change Detection and Versioning Service," 2021 IEEE International Conference on Smart Data Services (SMDS), Chicago, IL, USA, 2021, pp. 82-84 (Year: 2021).*

G. Abinaya, G. Ranjan and P. Aswin Karthik, "Continuous learning mechanism of NLU-ML models boosted by human feedback," 2019 International Conference on Computational Intelligence in Data Science (ICCIDS), Chennai, India, 2019, pp. 1-6, (Year: 2019).*

* cited by examiner

*FIG. 4*

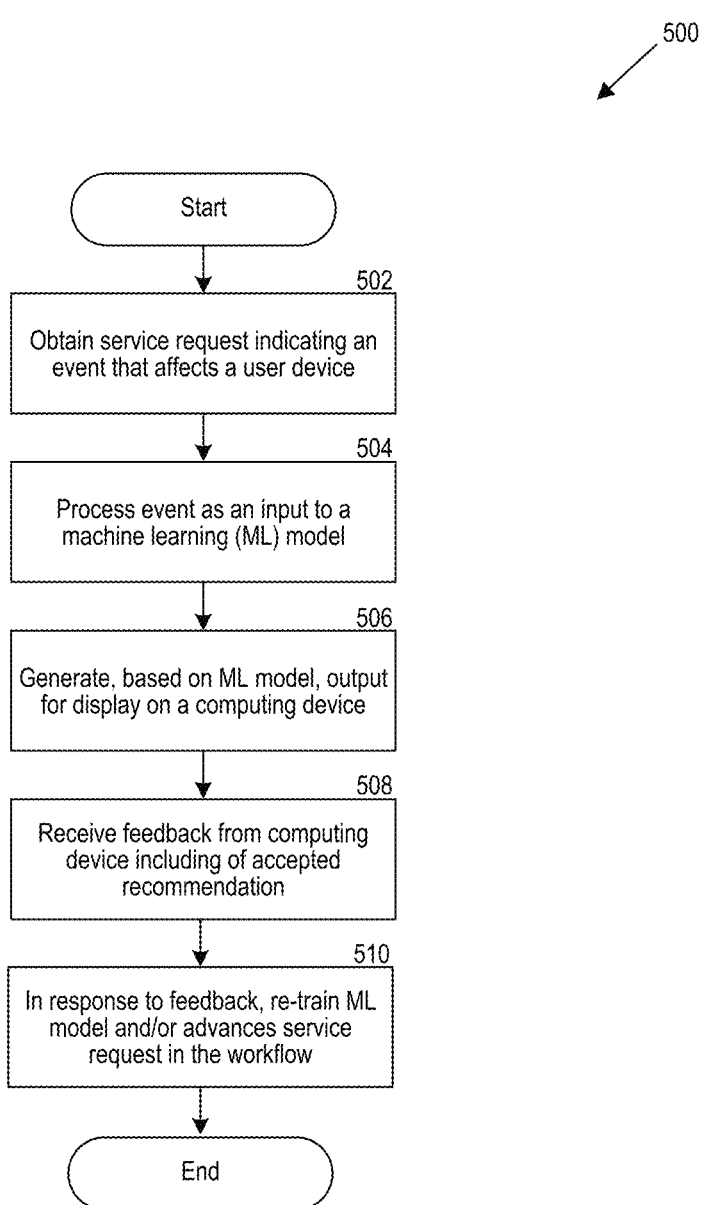

500

Start

502

Obtain service request indicating an event that affects a user device

504

Process event as an input to a machine learning (ML) model

506

Generate, based on ML model, output for display on a computing device

508

Receive feedback from computing device including of accepted recommendation

510

In response to feedback, re-train ML model and/or advances service request in the workflow End

*FIG. 5*

RECOMMENDATION ENGINE WITH MACHINE LEARNING FOR GUIDED SERVICE MANAGEMENT, SUCH AS FOR USE WITH EVENTS RELATED TO TELECOMMUNICATIONS SUBSCRIBERS

CROSS-REFERENCE TO RELATED APPLICATIONS

This application is a continuation of U.S. patent application Ser. No. 17/515,053, filed on Oct. 29, 2021, entitled RECOMMENDATION ENGINE WITH MACHINE LEARNING FOR GUIDED SERVICE MANAGEMENT, SUCH AS FOR USE WITH EVENTS RELATED TO TELECOMMUNICATIONS SUBSCRIBERS, which is hereby incorporated by reference in its entirety.

BACKGROUND

Information Technology Service Management (ITSM) relates to activities that are performed by an entity (e.g., telecommunications operator) to design, build, deliver, operate, and control information technology (IT) services. ITSM is characterized by adopting a process approach towards management, focusing on customer needs and IT services for customers rather than IT systems. ITSM processes, especially workflow driven processes, can benefit significantly from being supported with specialized software tools. Core to the tools is a workflow management system for handling events/alarms/faults, incidents, service requests, problems, changes, etc. The ability of these tools to enable easy linking between event, incident, service request, problem, and/or change records with each other and with records of configuration items in a database can be advantageous.

A service desk of a telecommunications operator is an example of an ITSM function. The service desk is considered a central point of contact between service providers and users/customers on a day-to-day basis. It is also a focal point for reporting incidents (e.g., disruptions or potential disruptions in service availability or quality) and for users making service requests (e.g., routine requests). A call center or help desk is a type of service desk that provides only a portion of what a service desk offers. Specifically, a service desk has a broader and user-centered approach which is designed to provide a user with an informed single point of contact for all IT requests. A service desk seeks to facilitate the integration of business processes into the service management infrastructure. In addition to actively monitoring and owning incidents and user questions, and providing the communications channel for other service management disciplines with the user community, a service desk also provides an interface for other activities such as customer change requests, third-party requests (e.g., maintenance contracts), and software licensing.

BRIEF DESCRIPTION OF THE DRAWINGS

Detailed descriptions of implementations of the present invention will be described and explained through the use of the accompanying drawings.

FIG. 4 illustrates a service management interface including recommendations to guide users through a workflow that reduces noise and improves operational efficiencies.

FIG. 5 illustrates a process performed by a service management system including a recommendation engine with machine learning capabilities to guide users through a workflow.

Figure 1:
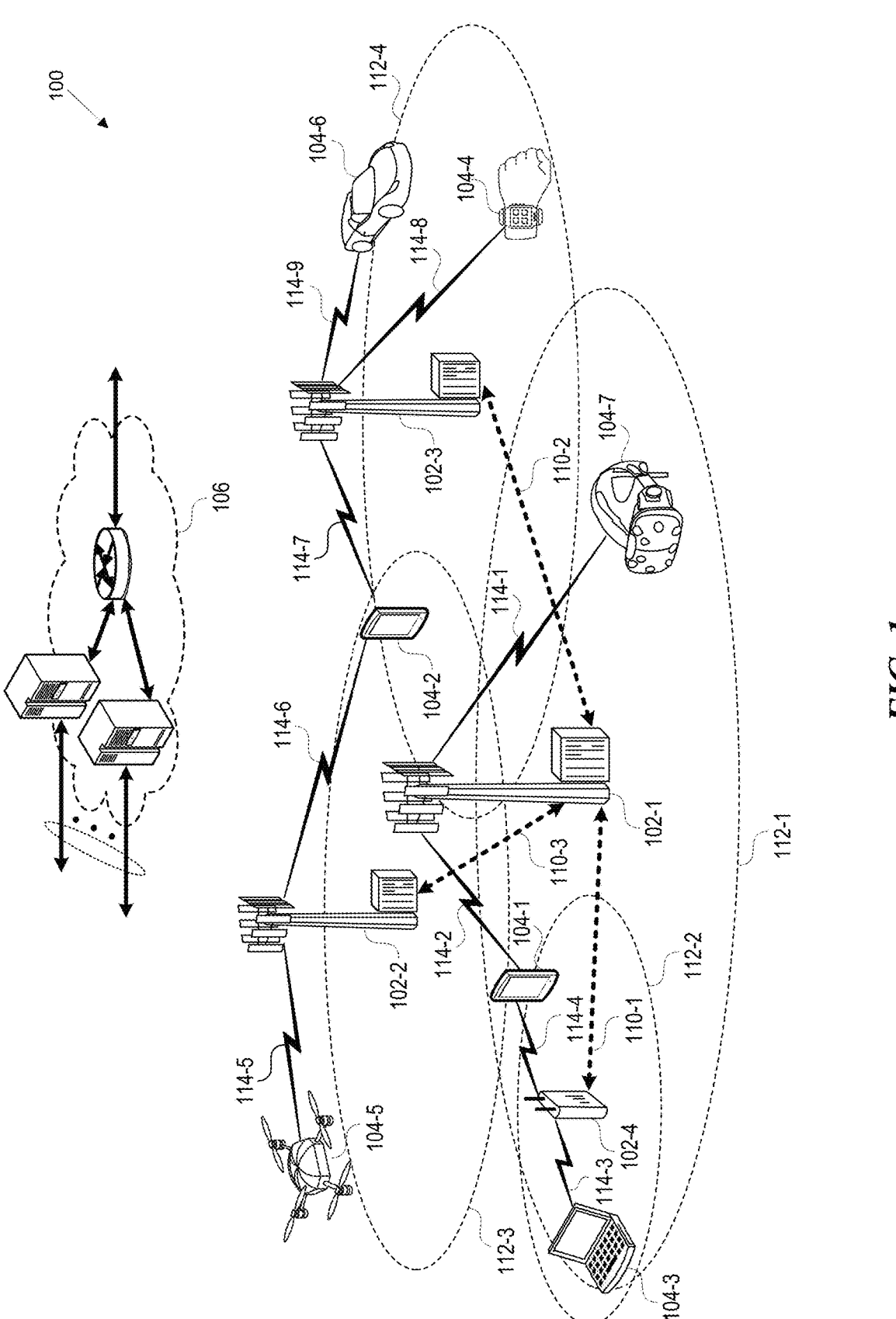
FIG. 1 is a block diagram that illustrates a wireless communications system in which at least some operations described herein can be implemented.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a recommendation engine that guides service management to reduce noise and improve operational efficiencies. For example, the recommendation engine can guide Information Technology Service Management (ITSM) to reduce noise and improve operational efficiencies of a Network Operations Center (NOC). The recommendation engine leverages machine learning (ML) algorithms to make predictions based on prior service events ("events") such as alarms, incidents, tickets, problems, changes, etc. related to subscribers of telecommunications services and recommends the future behavior for an alarm, incident, problem or change record.

In one example, a telecommunications system implements a service management system that includes a recommendation engine with ML. The service management system can effectively monitor and manage the telecommunications network, host, and database systems. Based on historical event data that has been aggregated over time, the recommendation engine generates outputs for guiding "reviewers" through service management workflows. The outputs can have data pairs indicative of recommendations, where each data pair includes an attribute for an event and a corresponding value, which a reviewer can accept or reject. As a part of artificial intelligence (AI), the ML algorithm of the recommendation engine can build the ML model based on the event data, configured as training data, in order to make predictions or decisions without being explicitly programmed to do so. In some examples, the ML training involves assigning weights for a classification framework to identify and/or discover classifications and attributes for events. The accept/reject feedback of the reviewers provides ongoing training for an ML model (e.g., the ML algorithm).

An NOC can refer to one or more locations from which network monitoring and control, or network management, is exercised over a telecommunications system, computer network, or other system. This disclosure describes examples of events for the sake of understanding; however, any indication of an occurrence to a device that includes a service request can constitute an event. An example includes an alarm that indicates an event and is reported for review. An incident refers to an unplanned interruption or reduction in the quality to a service. A ticket refers to a record that details one or more events. A problem refers to a cause of one or more incidents, and a change can be included in a service request for upgrading software or ordering an account for a user. The recommendation engine can thus process these and other types of events that are not described herein for the sake of brevity.

The recommendation engine can support existing policies and frameworks of an organization such as Information Technology Infrastructure Library (ITIL), which is a collection of best practices for IT service management. The ITIL defines ITSM tools such as a service desk, which provides a single point of contact (SPOC) between the organization and its customers, employees, and/or business partners. The purpose of a service desk is to ensure that users receive appropriate help in a timely manner. Service desks can handle both incidents and requests. In this context, an incident is an event that results in a disruption in service availability or quality. A request can seek help with a routine task, such as helping a user change a password or getting a new user setup.

In an example of a service management workflow, an alarm is triggered in response to detection of an anomalous event, which refers to an event that deviates from what is standard, normal, or expected. A service request is generated for a reviewer (e.g., human, machine) to evaluate the alarm and consider what investigation is required. The reviewer can create a ticket and fill in relevant information into the ticket to classify the alarm. The reviewer routes the classified alarm to a suitable assignment group, which can include other reviewers that are trained to resolve the same types of events.

The recommendation engine is incorporated into service management workflows to aggregate events data that is used to train an ML model. The outputs of the ML model can include recommendations for attributes of events that are targeted to guide reviewers in a manner that reduces noise and increases operational efficiencies. For example, events can be generated and processed in normal ITSM workflows, and, in some instances, an incident record is created for managing an incident. A reviewer populates that record as the incident advances through a workflow to track the state of the associated incident. The record can link an alarm, incident, problem, and resolution along with metadata regarding how, when, and by who an incident is handled. The record can be stored in a memory for later use rather than being deleted once an event is resolved.

The recommendation engine utilizes big data technology to computationally analyze datasets in order to reveal patterns, trends, and associations, especially relating to human behavior and interactions with recommendations. As such, aggregating and processing events data becomes part of service management workflows. The recommendation engine trains the ML model based on past and current events data to build an ML model with a classification framework that classifies events based on attributes. The ML model can map types of events (e.g., classes) to assignment groups that can most effectively process those events. As such, the recommendation engine can mitigate inefficiencies due to false-positives, misclassifications (e.g., due to a lack of classifying information), misrouting to wrong assignment groups, investigating events that are anomalous but not malicious, or failing to identify root causes of events.

The classification framework can define events and one or more attributes of the events. Examples of the attributes include delays, types, or other characteristics that can be manually defined in a dictionary of (or discovered by) the recommendation engine. In one example, incidents can be classified based on a cause, affected objects, resolutions implemented, or any relevant characteristic defined in the dictionary. The classification framework can also consider behaviors, such as whether characteristics of detected problems or changes are anomalous. The classification framework can associate weights to events or attributes such that those associated with greater weights have a greater influence in predictive processes. The weights can be based on, for example, whether and how often users accept recommendations. For example, if a reviewer accepts a recommendation for a 3 second delay and rejects other recommendations, the accepted recommendation is associated with a greater weight compared to the rejected recommendations.

The following tables are examples of dictionary data that can be used to train the recommendation engine and for making predictions. Specifically, Table I shows an example of a dictionary dataset for incident/ticketed events and Table II shows an example of a dictionary dataset for problems.

TABLE I

| Incident/Ticketed | | | |
| --- | --- | --- | --- |
| Incident/Ticket Attributes | Ticket System Updated | Manually Managed | Metrics Context |
| Value Add | | | Yes |
| AutoCreated | | | Yes |
| AutoDiagnosis | | | Yes |
| SuccessfulAutoDiagnosis | | | Yes |
| AutomationEnabled | | | Yes |
| AutoResolved | | | Yes |
| Ticket URL | PIER | | |
| TT_ID | PIER | | |
| Manager Class | PIER | | |
| Alarm Name | PIER | | |
| Runbook | PIER | | |
| Element ID | PIER | | |
| Element Class | PIER | | |
| Source System | PIER | | |
| Incident Category | PIER | Yes | |
| Symptom | PIER | Yes | |
| Cause | PIER | Yes | |
| ResolveUpdatedCause | PIER | | |
| Resolution | PIER | Yes | |
| Resolution Comments | PIER | | |
| Market | PIER | | |
| TT Created Date | PIER | | |
| Resolved Date | PIER | | |
| TT Created By | PIER | | |
| CauseUpdatedBy | PIER | | |
| CorrectCauseUpdatedBy | PIER | | |
| ResolvedBy | PIER | | |
| First Assigned Group | PIER | Yes | |
| Assigned Group | PIER | Yes | |
| Assignee | PIER | | |
| Customer | PIER | Yes | |
| Functional Area | PIER | Yes | |
| Ticket Type | PIER | Yes | |
| TT Type | PIER | | |
| Priority ID | PIER | | |
| AMO Class | PIER | | |

TABLE II

| Alarms | | | |
| --- | --- | --- | --- |
| Alarm Attribute | Alarm System Updated | Manually Managed | Metrics Context |
| ES | No | | Yes |
| EQ | No | | Yes |

5

TABLE II-continued

Alarms

| Alarm Attribute | Alarm System Updated | Manually Managed | Metrics Context |
|---|---|---|---|
| EC | No | | Yes |
| EK | No | | Yes |
| Alarm Customer | No | Yes | |
| 1C ID | OneConsole | | |
| Alarm Source | FM | | |
| Forwarding System | FM | | |
| Alarm Created Dt | FM | | |
| Alarm DisplayDt | FM | | |
| Alarm Cleared Dt | FM | | |
| Alarm Duration Minutes | OneConsole | | |
| Alarm Technology | No | Yes | |
| Manager Class | FM | | |
| AMO Class | FM | | |
| AMO | FM | | |
| Alarm Name | FM | | |
| View | FM | | |
| Severity | FM | | |
| Parent Ind | FM | | |
| ElementID | FM | | |
| CI Class | FM | | |
| First NEST | NEST | | |
| NEST | NEST | | |
| KMS | FM | | |
| Ack By | OneConsole | | |
| Auto Ticket | KMS | | |
| TT ID | OneConsole/PIER | | |
| TT Type | OneConsole/PIER | | |
| TT Action | OneConsole/PIER | | |
| TT Action By | OneConsole/PIER | | |
| TT Created By | OneConsole/PIER | | |
| Incident Category | OneConsole/PIER | | |
| Resolution | OneConsole/PIER | | |

As shown above, attributes of an incident/ticket can include a symptom, cause, assignment group, etc. The attributes can be manually defined for the dictionary or discovered later by the recommendation engine. The recommendation engine is trained based on the dictionary data and can automatically update the dictionary data as it learns based on user input. Also shown above, the attributes of an alarm can include a view, whether acknowledged ("Ack By"), whether cleared ("Alarm Cleared Dt"), etc. The attributes shown above are non-limiting examples of attributes that can be customized for service management systems.

The "Ticket System Updated" or "Alarm System Updated" columns refer to updates and their sources. For example, "OneConsole" and "PIER" refer to different tools that can be used to provide updates. "Manually Managed" refer to whether a respective attribute is manually managed by a user, and "Metrics Context" refers to whether particular attributes are associated with metrics context. For example, metrics can measure coherence, significance, noise-level in alarms.

The ML model can provide recommendations once trained based on a predetermined threshold amount of event data. The recommendation engine can continuously adapt with ongoing training based on event data to improve recommendations that reduce noise and improve operational efficiency of the NOC. The recommendations can include data that replaces or augments data of one or more record behaviors in service management workflows. In some embodiments, after a threshold amount of training, automation of the recommendation process can replace the role of a reviewer. Through ML processing of event data, redundant or unimportant events that do not warrant any action by assignment groups can be ignored or discarded. In another example, the ML model can identify a likely cause of an incident based on prior causes of similar incidents. The recommendation engine learns from prior resolutions of similar incidents to predict a cause of a new incident. The recommendation engine can also suggest the appropriate assignment group, thereby enabling faster resolution and reduced manual effort by the reviewer.

Through ongoing ML training, the recommendation engine improves future recommendations for, among other things, classifications and attributes based on insights from historical and current event data. As such, the ML capabilities of the recommendation engine improve service management workflows through feedback from reviewers including inputs in response to recommendations output by the recommendation engine.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed wireless devices noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Service Management System Overview

Figure 2:
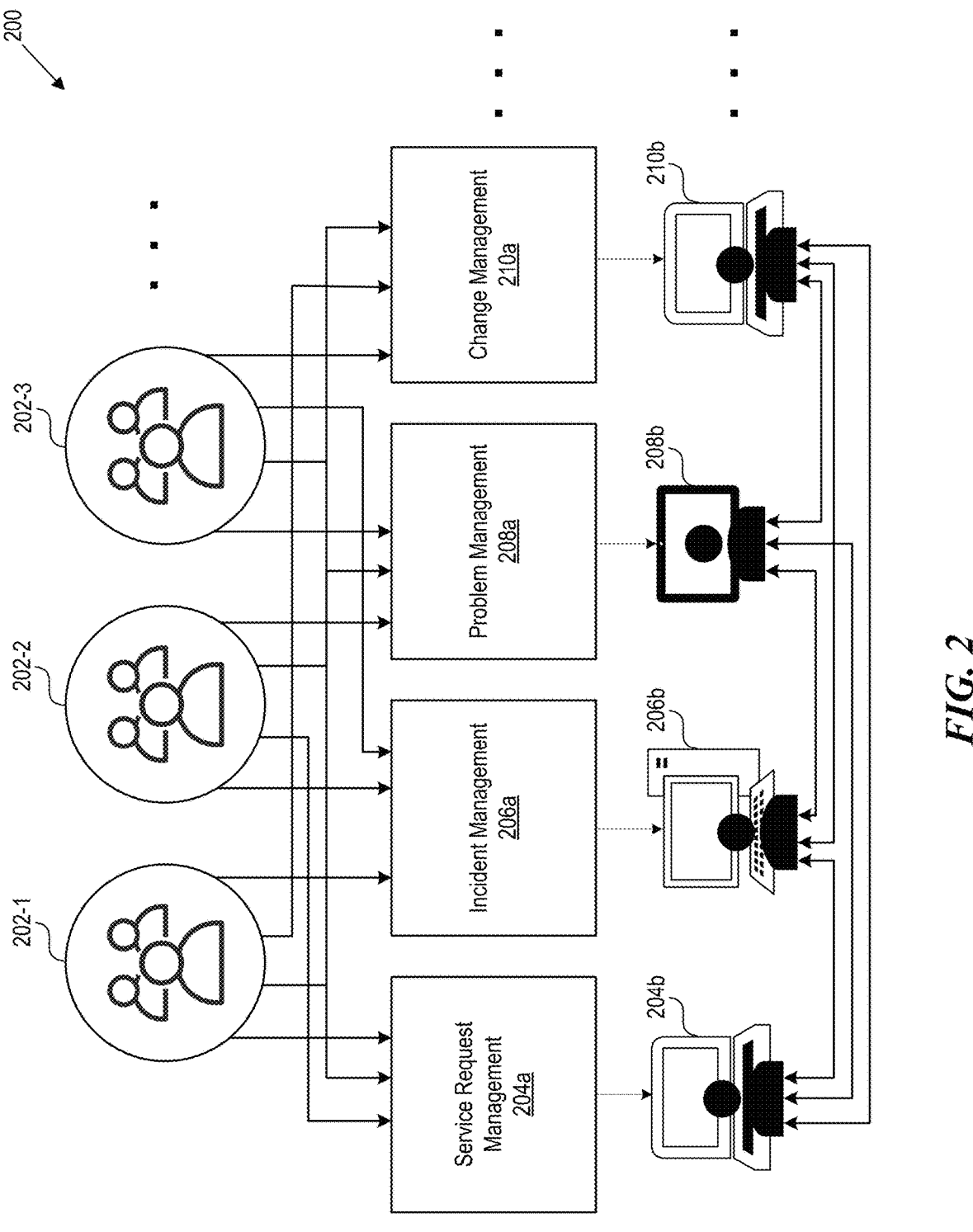
FIG. 2 is a block diagram of a system that implements service management workflows.

FIG. 2 is a block diagram of a system that implements service management workflows. The system 200 includes modules that serve groups of users 202-1, 202-2, and 202-3 (referred to collectively as "users 202" and individually as "user 202") in an organization. In the illustrated non-limiting example, the modules include a service request management module 204a, an incident management module 206a, a problem management module 208a, and a change management module 210a. Each of the example modules 204a through 210a are independent and has a counterpart reviewer that processes the events received by that module. For example, events that are routed to the service request management module 204a are evaluated by a service request reviewer 204b. Likewise, an incident management reviewer 206b handles events received by to the incident management module 206a, a problem management reviewer 208b handles events received by the problem management module 208a, and a change management reviewer 210b handles events received by the change management module 210a.

The service request management module 204a handles requests from users for information, advice, or to access a service, such as when a subscriber to a wireless telecommunications network requests an upgrade to a service for a mobile device on the network. The incident management module 206a handles incidents such as unplanned interruptions or reductions in quality of a service. Accordingly, the incident management reviewer 206b works to get devices up and running after interruptions or to return the quality of service back to normal. The problem management module 208a determines causes of one or more incidents, and the problem management reviewer 208b is responsible for investigating a cause and remedying the problem. A problem ticket can be created even in the absence of an incident to relate to it. For example, the reviewer 208b can conduct a root cause analysis, often involving multiple reviewers that prevent problems from recurring. A change management reviewer 210b handles addition, modification, or removal of anything that could affect services for a device.

In an example of a service management workflow, the users 202 or devices select the modules to which events are routed. A workflow can thus involve receiving an indication of an event, analyzing the event, and flagging the event for investigation. A reviewer of an assignment group attempts to address issues related to the event and, if the reviewer is unable to address the issues, reroutes the event to a different assignment group. Thus, events of groups of users 202 are routed to dedicated modules and handled by reviewers of assignment groups, where any misclassified events are rerouted to other modules or reviewers. In prior systems, this cycle continues until the event is resolved.

The recommendation engine improves service management by formulating and presenting recommendations that guide reviewers to effectively handle service-related messages. The recommendation engine can be included in a system that combines service modules into a uniform platform and utilizes an ML model that is trained based on past events data to formulate recommendations that guide reviewers through a service workflow. The system can implement supervised and/or unsupervised learning to train the ML model. The supervised learning is based on training data including inputs and desired outputs (e.g., a supervisory signal). For example, reviewers can reclassify outputs as desired outputs that are used to train the ML model. In contrast, unsupervised learning algorithms do not use supervisory feedback. The ML algorithms, therefore, learn from past event data that are unlabeled, reclassified, or recategorized. Instead of responding to feedback, unsupervised learning algorithms identify commonalities in the data and react based on the presence or absence of such commonalities in each new event.

Recommendation Engine

Figure 3:
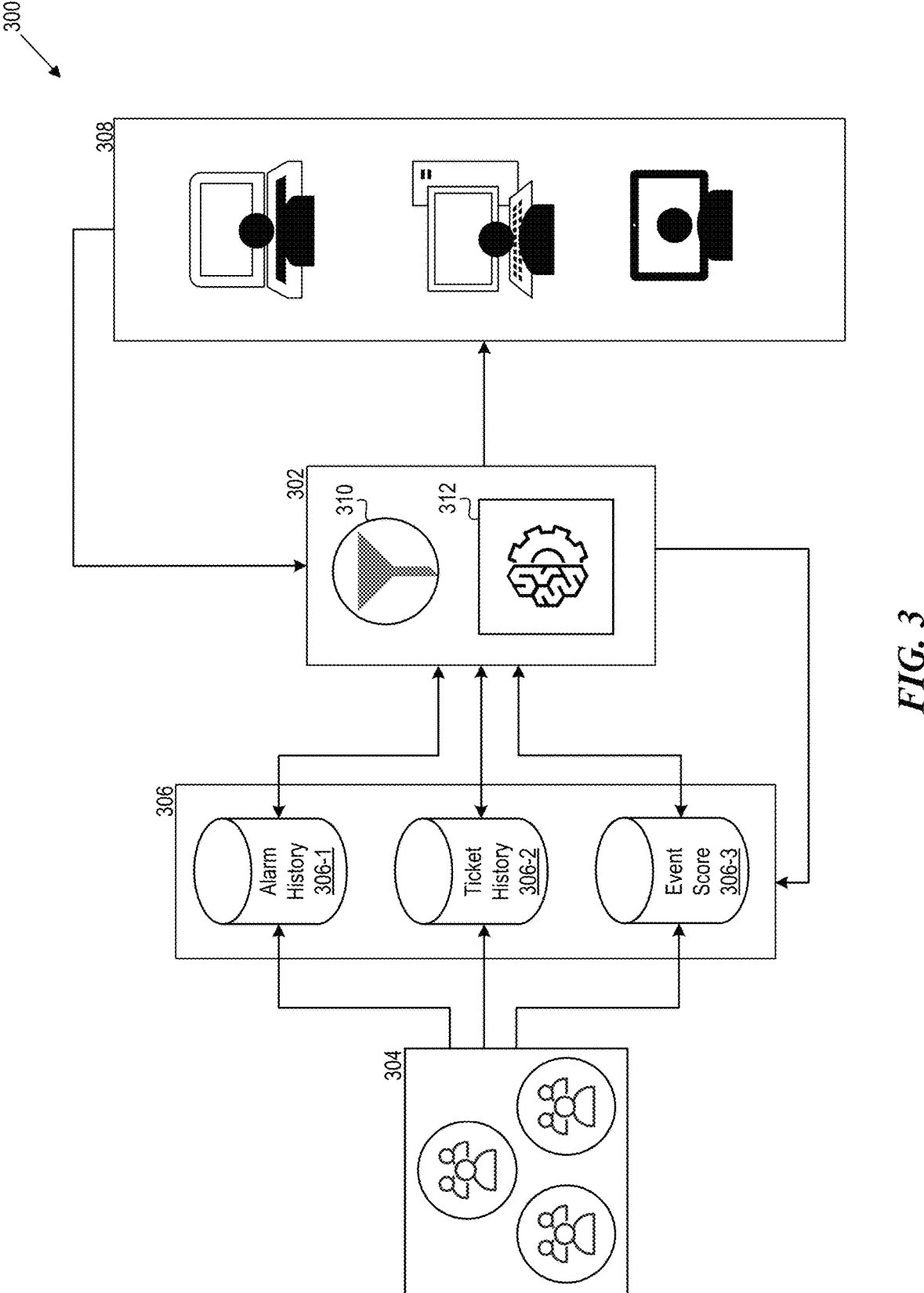
FIG. 3 is a block diagram that illustrates a service management system that includes a recommendation engine.

FIG. 3 is a block diagram that illustrates a service management system that includes a recommendation engine. The recommendation engine 302 advances the objectives of the service management system 300 ("system 300") to reduce noise and improve operational efficiencies. Examples of noise include events that do not warrant immediate action because, for example, the same types of events have historically been resolved without further investigation. These types of events have a low value or a short duration that, as such, wastes the effort of reviewers to identify unimportant or duplicate events.

The recommendation engine 302 can be integrated in or separate from the system 300 and processes event data stored at memory devices 306, which were communicated from user devices 304. The illustrated and non-limiting examples of the memory devices 306 include an alarm history database 306-1, ticket history database 306-2, and event score database 306-3. Implementations can include any number of memory devices that store different types of event data. The recommendation engine 302 can store the recommendations and feedback from the assignment groups 308 at the memory devices 306. The assignment groups 308 can be human or machines. The recommendations can suggest attributes for events and associated values, which a reviewer can accept or reject. The input including whether a reviewer accepts/rejects an attribute and value can be fed back to the recommendation engine 302 and stored at the memory devices 306 as future training data.

A workflow can include knowledge aspects to populate the memory devices 306 with expert knowledge, including the supervisory feedback from reviewers regarding the recommendations to guide the workflow. The recommendation engine 302 can affect all aspects of a service workflows including any event and an entirety of activities that are usually directed by service management policies. The recommendation engine 302 can analyze behaviors of different events to formulate recommendations designed to reduce noise and improve operational efficiencies. In one example, the recommendations are presented on a user interface as cue cards for the assignment groups 308. The recommendations are designed to influence whether and which of the assignment groups 308 should respond to events, and how they should respond. The recommendation engine can also cause the system 300 to trigger actions autonomously such as populating fields of a record for an event and initiating next actions.

The recommendation engine 302 includes a data mining component 310, which implements processes for extracting and discovering patterns in events data. The data mining component 310 can provide database and data management, data pre-processing, model and inference considerations, metrics processing, complexity considerations, post-processing of discovered data, visualization, etc.

In one example, the data mining component 310 extracts and standardizes data related to the event to have a common format or use a common classification framework. Further, the event data can be classified for different types of recommendations. In some examples, the data mining component 310 implements content-based filtering, collaborative filtering, clustering, and can formulate recommendations based on expert knowledge (e.g., supervisory feedback). The collaborative filtering sorts events data having similar characteristics into respective groups, which can be used as training data for the ML model. The content-based filtering sorts events data based on known data (e.g., content) of an item (name, location, description, etc.) rather than patterns, behavior, etc. A recommendation based on expert knowl- edge can include using predefined criteria to filter data for particular preferences, etc. That is, a reviewer may prefer to review recently resolved tickets that are similar to a current ticket. In contrast, a user can choose to read documentation rather than not follow previous resolutions.

The recommendation engine 302 can perform analytics that enable continuous iterative exploration and investiga- tion of past events to predict future performance and gen- erate recommendations accordingly. The analytics utilizes statistical methods to form a data-driven understanding of a workflow and to develop new insights into the effect of an event on a service and/or device. The analytics makes extensive use of tools and analytical modeling and numeri- cal analysis, including explanatory and predictive modeling, as well as fact-based management to drive decision-making.

The recommendation engine 302 has a modeling compo- nent 312 including one or more ML algorithms that can construct an ML model for service management based on past event data and automatically improve performance through processing of additional event data. That is, the modeling component 312 can build an ML model based on sample event data input as training data, which enables predictions or decisions as to the future events. In an example, the modeling component 310 includes a cataloging function that is created and updated based on event data and feedback regarding recommendations such that the impact of an event is predicted when comparing to data in the catalog of event data and after performing interpolation or other numerical, computational, or statistical methods to extrapolate whether and how an event should continue in a workflow. In one implementation, the recommendation engine 302 can simulate an effect of an event on a system component and formulate recommendations based on an evolution of the ML model to forecast how the event will affect the system component.

The modeling component 312 can implement techniques such as pattern analysis, classification algorithms, statistical models, and mathematical models. The recommendation engine 302 can use all or any relevant data from system logs, notification logs, command logs and more. With trained ML models and all input data, the recommendation engine can form a scalable solution build on a closed feedback loop in which the outputs of a recommendation engine are used as inputs.

The recommendation engine 302 can generate and/or administer a network portal. An example includes an online web-based portal that can display recommendation data in visualizations or other user-friendly features that enable the assignment groups 308 to investigate or ignore events and learn procedures for efficiently advancing workflows.

The assignment groups 308 include any devices (e.g., user devices) operable by reviewers who are authorized to access data output by the recommendation engine 302. In one example, reviewers are assigned roles that grant access to certain data or components of the recommendation engine 302. For example, a reviewer role can permit access to analytics whereas an administrator role can permit access to edit the ML model or modify the data mining component 310.

In every phase of service management, the recommenda- tion engine 302 can output recommendations that guide users (e.g., reviewers) with discrete but meaningful suggestions based on historical data. The recommendation engine 302 can identify an attribute for event/alarm, incident, change, problem or any ITSM record such as a view type, delay for an alarm, categorical values for symptom, cause, resolution, first assignment group and the final assignment group, priority, automations for an incident, risk score, categorical values for Change Request type, assignment group and, chronic nature of the issue, assignment group for a problem record. In one example, the recommendation engine 302 is integrated into a phased workflow for pro- cessing alarms, incidents, and problems. The alarm phase includes operations to identify and log alarms, as well as classify and prioritize alarms. The incident and problem phases can run concurrently to investigate and diagnose causes, provide resolutions, and recover components, and close events. As such, the recommendation engine 302 enables guided handling to resolve events. This recommen- dation process increases the predictability of service man- agement with consistent classifications. A "view type" of an alarm relates to determining whether the associated event is worth displaying to an end user and also the type of operations team such as Tier 1 NOC, Tier 1 operations for market teams that should see the event. For example, if an alarm always clears itself, such as a transient fault, intro- ducing a delay would reduce the noise to NOC. The rec- ommendation engine can learn such alarm behavior and recommend transient alarms for certain delay so they appear to the NOC after an interval of a few minutes such that the NOC can attend other important alarms.

The recommendation engine 302 can support and enforce existing service management policies. That is, the modeling component 312 can train an ML model to support existing policies. For example, a policy supported by the recommen- dation engine 302 can require that all incidents should subscribe to a standard classification schema that is imple- mented across an organization. This provides support for faster access to incident and troubleshooting data. The policy also provides better support for problem management diagnostic and proactive trending activities. This means that a well-defined and communicated set of incident classifica- tion categories are in place.

Another policy can require that all incidents utilize a common format and set of information fields whenever possible. This policy ensures that all required data of inci- dents is made available in a common format to support incident management activities and is easily shared across other support areas dependent on incident information. Yet another policy can require a common and agreed set of criteria for prioritizing and escalating events (e.g., inci- dents). This ensures that an accepted means is in place for prioritizing and escalating incidents based on agreed policies and not solely determined by individuals within an organi- zation. The criteria for prioritizing and escalating incidents are thus established in advance and implemented by the recommendation engine 302. In an example, an escalation policy can raise a problem record to determine a root cause.

The recommendation engine 302 can leverage past inci- dent-resolutions to autonomously set attributes that make an event actionable. In one example, an indication of the alarm is received and displayed on an interface for a reviewer of an assigned group to determine whether and how to respond. Examples of attributes include a time delay, view type, or alarm behavior in general. The time delay can be set to a numerical value (e.g., 1 hour, 15 minutes, 5 minutes), the view type can be set to one of multiple types (e.g., impacted, non-impacted), and in general, the alarm behavior can include one or more attributes (e.g., alarm type, knowledge availability). The recommendation engine 302 can automatically select the attributes and set values based on the historical information to reduce noise and improve operational efficiencies of the service management system.

Figure 4:
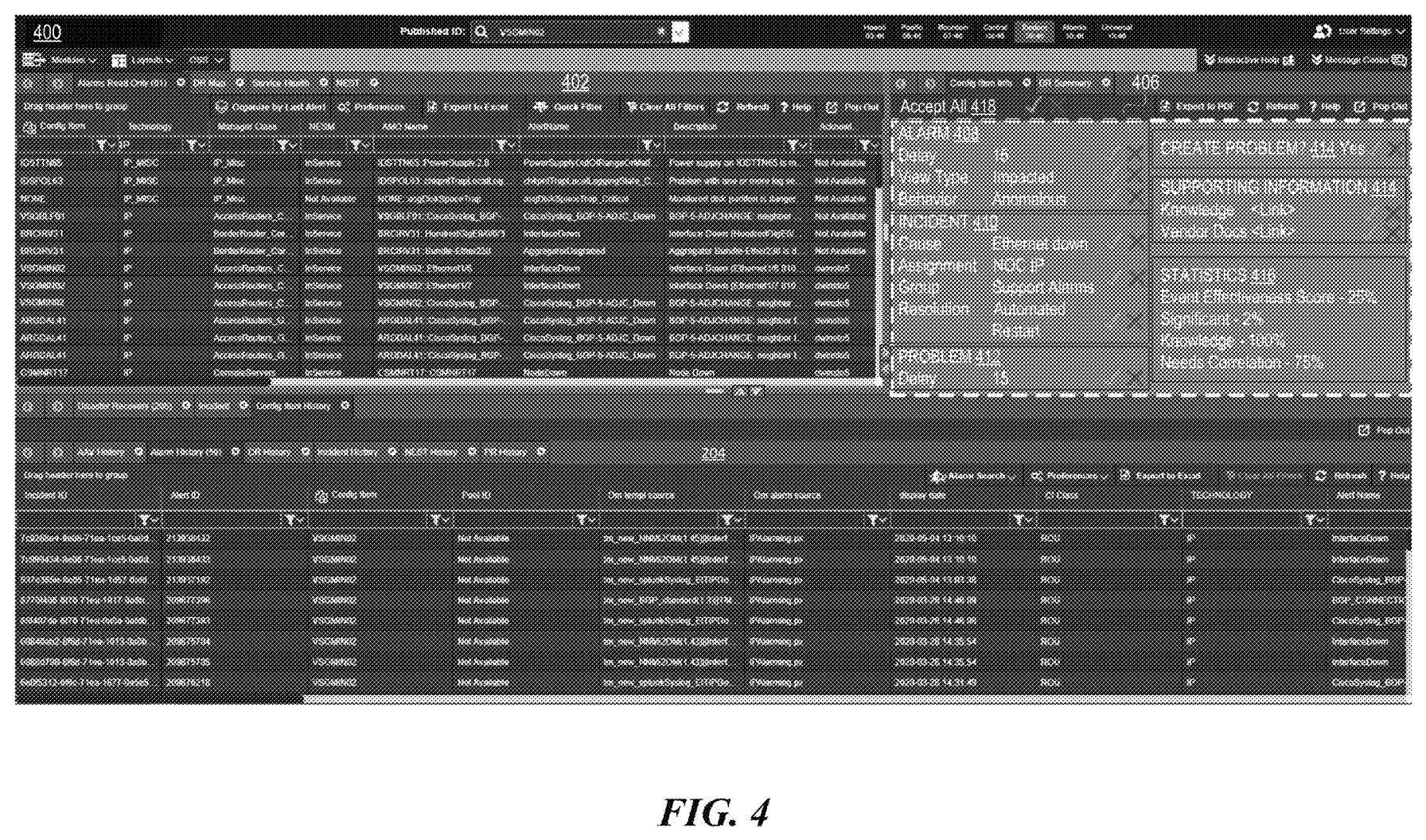

FIG. 4 illustrates a service management interface including recommendations to guide users through a workflow that reduces noise and improves operational efficiencies. As shown, the interface 400 includes sections that list current events data 402 (e.g., alarms, incidents) sorted in different tabs and historical events data 404 (e.g., past alarms, incidents). The interface 400 includes a recommendation section 406 that shows attributes and values for a selected one of the events shown on the interface 400. In the illustrated example, the recommendation section 406 lists attributes of an alarm 408, incident 410, and problem 412. The attributes of the alarm 408 include a time delay, view type, and behavior. The attributes of the incident 410 include a cause, assignment group, and resolution. The attribute of the problem includes a time delay. A reviewer can manually select a checkmark or "X" of an attribute to accept or reject, respectively, the attribute and/or its value. The recommendation section 406 also includes an option to "create problem" 414 and to accept or reject supporting information 414 including a knowledge hyperlink or a hyperlink to vendor documents. The recommendation section 406 also shows statistical information 416 of the event including an event effectiveness score, significance, knowledge, and needs correlation. The values for attributes can be individually accepted or rejected by a reviewer. The reviewer can alternatively use the Accept All 418 control to simultaneously accept or reject all values of the attributes listed in the recommendation section 406.

Referring back to FIG. 3, the recommendation engine 302 thus takes inputs and provides outputs that influence service management. In one example, inputs include a class, name, and event significance score. The recommendation engine 302 can suggest alarm display attributes and ticket delays based on historically how long it usually takes for incidents to resolve so that reviewers can dismiss those incidents rather than conducting an exhaustive investigation. The event significance score is a measure of percent of nonvalue add (NVA) resolutions, where previous resolutions were not leveraged to automatically setup attributes and make events actionable. A view type refers to a non-NOC to disable from NOC view if 100% of incidents from a certain alarm result in NVA ticket resolutions. A time delay is required to make actionable alarms; for example, ticketing in the first 15 mins of an alarm makes it a high NVA.

The recommendation engine 302 can reduce the time required to diagnose and resolve incidents by leveraging information of prior events to recommend possible root causes for investigating. This helps a reviewer prioritize troubleshooting options depending on potential root causes. In particular, the recommendation engine 302 leverages ML algorithms to reduce a time required to resolve an incident and suggests a cause for an associated alarm. The recommendation engine 302 can also classify events based on patterns that arise and/or are cleared. Thus, the ML algorithms are trained based on past resolutions to predict the cause of an event, which enables routing of the event to the most suitable assignment group.

In contrast, service management without the recommendation engine go through tedious manual troubleshooting and delays to resolve an event because the reviewer may need to consider all possible causes. For this example, the class and name inputs are used along with patterns referred to as a correlation signature and a causation signature to present how a parent alarm condition developed and how it subsides. Based on the history of all tickets of the alarm name and its signatures, the recommendation engine can identify the cause as power, communication, hardware, and/or software. The recommendation engine can identify the piece of hardware and initiate a remote reset or assign for physical reset. As a result, both the amount of time required to analyze incidents is reduced, as well as the total number of incidents that require review.

The recommendation engine 302 can reduce a total number of event tickets that are misrouted or delayed so that only the most suitable assignment groups consistently resolve events. Once a cause is identified, the recommendation engine 302 can recommend the assignment group based on an output of an ML algorithm. For example, if a database is identified as the cause of an application service failure, the recommendation engine 302 can recommend a database assignment group rather than a default application support assignment group. In this example, the ML algorithm determined that similar events experience significant delays in the application support group followed by being rerouted to the database assignment group. Even without cause identification, the recommendation engine 302 can suggest the assignment group based on historical data indicating that a majority of resolutions for a particular event name are efficiently resolved by a particular assignment group. As a result, the recommendation engine 302 can reduce the total number of tickets, the number of tickets that are analyzed, and the time spent analyzing tickets.

The recommendation engine 302 can correlate events, including use of node and connection topology to identify related events that tend to occur concurrently. For example, the recommendation engine supports planned maintenance that resolves drawbacks of tools that do not effectively correlate events that impact maintenance. For example, the recommendation engine 302 can use node and connection topology to identify impacts of maintenance and the ML algorithms are leveraged to reduce self-inflicted noise. For example, the recommendation engine 302 can suggest the view type as "impacted" during maintenance based on the node and connection topology. In another example, the recommendation engine can suggest the view type as "child," "related" or "dependent" during maintenance based on node and connection topology.

The recommendation engine 302 can utilize an event effectiveness scorecard as a measure of operational effectiveness. The recommendation engine 302 improves operational effectiveness by reducing noise and improving efficiencies through recommendations. The scorecard indicates various levels of effectiveness between low context and rich context events. The metrics measure the coherence, significance, noise-level in alarms and as well as effective supporting information. The recommendations from the recommendation engine 302 are configured to improve this scorecard. The effectiveness can range from low context, less actionable, effective, highly actionable, and rich context. These correspond to a range from usable events (coherence), value-focused event management (significant only), knowledge centered event management, and remove redundancies (correlations).

FIG. 5 illustrates a process performed by a service management system including a recommendation engine with machine learning capabilities to guide users through a workflow that reduces noise and improves operational efficiencies. The recommendation engine can perform aspects of the process 500 alone or in combination with other components of the service management system ("system")

including, for example, separate devices coupled to the recommendation engine over a network. In one example, the service management system is an ITSM system of a NOC.

At 502, the system obtains a service request message ("service request") indicating an event that affects a device supported by the system. For example, the system detects an incident that affects a device or receives the service request indicating a problem that affects the device. In one instance, the service request can indicate that the device is affected by an interruption or degradation of a service. More specifically, the system can monitor a service of the device supported by the system and detect that the event is anomalous and affects the service as experienced by the device. In response to detecting that the event is anomalous, the system can trigger an alarm for the anomalous event.

The system can also optionally store an indication of the event at a memory device configured to store historical information of multiple events that affect devices supported by the system. As such, the system adds to the training data that can be used to continuously update the ML model (e.g., one or more ML algorithms) of the recommendation engine.

At 504, the system processes an indication of the event as an input to the ML model. For example, the system can simulate one or more effects of the event on a telecommunications network based on the ML model to forecast how the event affects the telecommunications network. The ML model is trained based on the historical information stored at the memory device. The ML model can be incorporated in the recommendation engine and include a data mining component that implements processes for extracting and discovering patterns in events data and a modeling component that builds the ML model based on sample event data input as training data and which enables predictions as to effects of future events. The ML model can also be built to conform with an existing policy for prioritizing and escalating events that satisfy a criterion.

The ML model can classify the event in accordance with a classification framework for different types of events including alarms, incidents, problems, changes, etc. An alarm can indicate an occurrence of an event and is detected by the system, an incident can indicate an unplanned interruption or reduction in quality to a service, a problem can indicate a cause of an incident including a particular device or software, a change can indicate a request to add, delete, or change a software component or hardware component of the device, etc.

The ML model can analyze a behavior of the event to determine that the event is anomalous and determine whether the anomalous event is malicious or non-malicious. As such, the ML model can generate recommendations including to, for example, ignore the event as an anomalous event that is non-malicious based on the historical information stored at the memory device.

At 506, the system generates, based on the ML model, an output for display on a computing device (e.g., of a reviewer). The output includes one or more recommendations each including an attribute of the event and a predicted value configured to reduce a workload or increase operational efficiency for a workflow of the system. In addition, each recommendation is configured to make the event actionable based on a control enabling an alternative selection to, for example, accept or reject the recommendation.

The system can cause the computing device to display, on an interface, recommendations. For example, the system can cause the computing device to display, on a user interface, graphical cue cards including recommendations for processing the event and control elements that enable a reviewer to accept/reject any, some, or all the recommendations. The ML model can generate a recommendation that indicates a particular cause of the event. The particular cause is determined based on prior events having a characteristic in common with the event. The ML model then generates the recommendation that identifies whether the event warrants action by an assignment group or should be ignored or discarded. In one example, the ML model generates a recommendation to route the service request to the assignment group selected by the ML model from among multiple assignment groups. The assignment group is selected based on prior events having a characteristic in common with the event and being more efficiently processed by the assignment group compared to another assignment group of the multiple assignment groups. In another example, a recommendation can indicate that the event is redundant or unimportant such that the reviewer can ignore or discard the service request.

The system can cause the computing device to display, on the interface, useful information including, for example, statistical information or supporting information for the event, as illustrated in FIG. 4. The statistical information indicates an effectiveness of resolving the event, a significance of the event, knowledge of the event, or an indication whether the event needs correlation with another event. The supporting information includes links to additional information about the event which can be alternatively accepted/ rejected.

At 508, the system receives feedback from the computing device (e.g., the reviewer's feedback) including an indication that the recommendations have been accepted or rejected. For example, the services request can indicate that the event is an alarm and an attribute for the alarm includes a time delay, a view type, or a behavior. In another example, the event is an incident and an attribute for the incident includes a cause, an assignment group, or a resolution. In another example, the event is a problem and an attribute of the problem includes a time delay after which the event is expected to resolve. A reviewer can accept/reject any of the attributes and/or their predicted values.

At 510, in response to the feedback, the system can optionally re-train the ML model based on the recommendations that have been accepted or rejected. The system can also configure a process of the workflow to route the service request to an assignment group of the service management system which has been selected based on the ML model or to bypass at least a portion of the workflow. The assignment group can be selected by the ML model based on, for example, having previously resolved an interruption or degradation of the service more efficiently than another assignment group of the system. To bypass at least the portion of the workflow includes, for example, to forego review of the service request by any assignment group and terminate the workflow. A recommendation that has been accepted includes an indication that the event is redundant or unimportant. The ML model can continuously adapt to ongoing training based on new events and, after sufficient training, replace at least a portion of the workflow.

The disclosed technology can be implemented in other architectures that enable additional advantages over prior service management systems. In one example, the disclosed system can tag a service request with an identifier. The identifier can include a timestamp and location data that enables tracking of the service request in a workflow. In other words, the identifier enables timely localization of the service request, which could be used to route the service request to geographically local assignment groups. As such, the system can permit remote customer support for any system that is distributed geographically such as a telecommunications system.

Computer System

Figure 6:
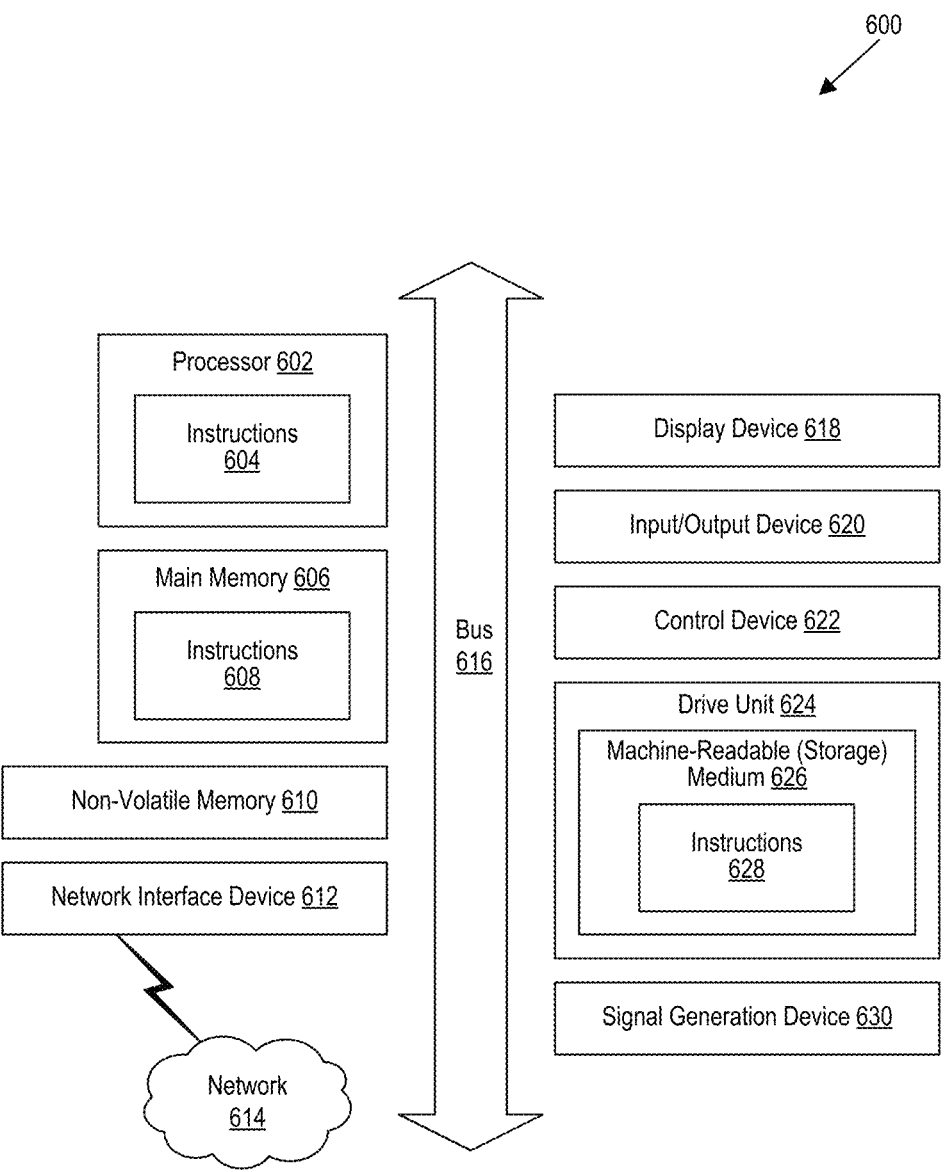
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A non-transitory, computer-readable storage medium comprising instructions recorded thereon that, when executed by at least one processor of a system, cause the system to:

obtain a service message indicating an event that affects a subscriber of a telecommunications network supported by the system;

store an indication of the event at a memory device configured to store historical information;

simulate an effect of the event on the telecommunications network based on a machine learning (ML) model, wherein the ML model is trained based on the historical information;

generate, based on the ML model, an output for display on a computing device, wherein the output includes one or more data pairs, each data pair including an attribute of the event and a predicted value configured to reduce noise and increase efficiency of the system, wherein the attribute of the event and the predicted value are stored in a dictionary, and wherein each data pair includes a control enabling an alternative selection to accept or reject each data pair;

receive the alternative selection from a reviewer to accept or reject a data pair using the control located in the displayed output;

adjust a weight associated with the attribute of the event in response to receiving the alternative selection;

retrain the ML model using the adjusted weight based on the alternative selection received from the reviewer to generate a subsequent predicted value configured to reduce the noise and increase the efficiency of the system; and update the dictionary, by the re-trained ML model, with the subsequent predicted value based on the feedback from the reviewer.

2. The non-transitory, computer-readable storage medium of claim 1, wherein the data pair of the one or more data pairs has been accepted, and wherein the data pair that has been accepted includes an indication that the event is redundant or unimportant.

3. The non-transitory, computer-readable storage medium of claim 1, wherein the ML model is configured to:

classify the event in accordance with a classification framework for different types of events including alarms, incidents, and problems, wherein an alarm indicates occurrence of an event and is detected by the system, wherein an incident indicates an unplanned interruption or reduction in quality to a service, and wherein a problem indicates a cause of an incident including a particular device or software.

4. The non-transitory, computer-readable storage medium of claim 1, wherein the system is further caused to:

train the ML model to conform with an existing policy for prioritizing and escalating events that satisfy a criterion.

5. The non-transitory, computer-readable storage medium of claim 1:

wherein the system is an Information Technology Service Management (ITSM) of a Network Operations Center (NOC), and wherein the service message includes a request to add, delete, or change a software component or hardware component.

6. The non-transitory, computer-readable storage medium of claim 1:

wherein the telecommunications network comprises a 5G network, and

wherein the ML model routes the service message to an assignment group based on having previously resolved an interruption or degradation of the telecommunications network more efficiently than another assignment group of the system.

7. The non-transitory, computer-readable storage medium of claim 1, wherein to obtain the service message includes causing the system to:

monitor the telecommunications network;

detect that the event is anomalous and affects the telecommunications network as experienced by the subscriber; and in response to detecting that the event is anomalous, trigger an alarm for the anomalous event, wherein the service message indicates the alarm, and wherein an attribute for the alarm include a time delay, a view type, or a behavior.

8. The non-transitory, computer-readable storage medium of claim 1, wherein the ML model is caused to:

analyze a behavior of the event to determine that the event is anomalous and determine whether the anomalous event is malicious or non-malicious; and generate the data pair indicative of a recommendation to ignore the event as an anomalous event that is non-malicious based on the historical information stored at the memory device.

9. The non-transitory, computer-readable storage medium of claim 1, wherein to obtain the service message includes causing the system to:

detect an incident that affects the subscriber, wherein an attribute for the incident includes a cause, an assignment group, or a resolution to the service message.

10. The non-transitory, computer-readable storage medium of claim 1, wherein to obtain the service message includes causing the system to:

receive the service message indicating a problem that affects the subscriber, wherein an attribute of the problem includes a time delay after which the event is expected to resolve.

11. The non-transitory, computer-readable storage medium of claim 1, wherein the ML model is caused to:

continuously adapt to ongoing training based on new events; or replace at least a portion of process after being sufficiently trained based on events.

12. The non-transitory, computer-readable storage medium of claim 1, wherein the ML model is caused to:

generate the data pair indicative of a recommendation that indicates a particular cause of the event, wherein the particular cause is determined based on prior events having a characteristic in common with the event; or generate the data pair indicative of a recommendation that identifies whether the event warrants action by an assignment group or should be ignored or discarded.

13. The non-transitory, computer-readable storage medium of claim 1, wherein the ML model is caused to:

generate the data pair indicative of a recommendation to route the service message to an assignment group selected by the ML model from among multiple assignment groups, wherein the assignment group is selected based on prior events having a characteristic in common with the event and being more efficiently processed by the assignment group compared to another assignment group of the multiple assignment groups.

14. The non-transitory, computer-readable storage medium of claim 1, wherein the system is further caused to receive a feedback message, and wherein prior to feedback message being received:

cause the computing device to display, on an interface, statistical information of the event, wherein the statistical information indicates an effectiveness of resolving the event, a significance of the event, knowledge of the event, or an indication whether the event needs correlation with another event.

15. The non-transitory, computer-readable storage medium of claim 14, wherein the system is further caused to, prior to the feedback message being received:

cause the computing device to display, on an interface, supporting information for the event, wherein the supporting information includes links to additional information about the event which can be alternatively accepted or rejected.

16. The non-transitory, computer-readable storage medium of claim 14, wherein the system is further caused to, prior to the feedback message being received:

cause the computing device to display, on a user interface, graphical cue cards including data pairs indicative of recommendations for processing the event and a control element that enables accepting or rejecting all the recommendations.

17. A method performed by a system, the method comprising:

obtaining a message indicating an event that affects a telecommunications network, wherein the message indicates a reduction in a quality of the telecommunications network;

storing an indication of the event at a device;

simulating the event based on a machine learning (ML) model, wherein the ML model is trained based on indications stored at the device;

generating, based on the ML model, an output for display, wherein the output includes data pairs that include attributes of the event and values configured to reduce noise and increase efficiency of the system, wherein the attribute of the event and the predicted value are stored in a dictionary, and wherein the data pairs include controls enabling a selection to accept or reject the data pairs;

receiving the selection from a reviewer to accept or reject a data pair using the controls located in the displayed output;

adjusting one or more weights associated with the attributes of the event in response to receiving the selection;

retraining the ML model using the adjusted one or more weights based on the selection received from the reviewer to generate subsequent predicted values configured to reduce the noise and increase the efficiency of the system; and updating the dictionary, by the re-trained ML model, with the subsequent predicted values based on the selection from the reviewer.

18. The method of claim 17, wherein the data pair of the data pairs has been accepted, and wherein the data pair that has been accepted includes an indication that the event is unimportant.

19. The method of claim 17 further comprising:

classifying, by the ML model, the event in accordance with a classification framework for different types of events including alarms, incidents, and problems, wherein an alarm indicates occurrence of an event and is detected by the system, wherein an incident indicates an unplanned interruption or reduction in quality to a service, and wherein a problem indicates a cause of an incident including a particular device or software.

20. The method of claim 17 further comprising:

training the ML model to conform with an existing policy for prioritizing and escalating events that satisfy a criterion.

\*    \*    \*    \*    \*